(No Model.)

G. B. SICCARDI.
CAR BRAKE AND STARTER.

No. 400,129. Patented Mar. 26, 1889.

WITNESSES.
Wm N Lowe
W. H. Wagner

INVENTOR
Giovanni B. Siccardi
per Roeder & Bridau
Attorneys.

UNITED STATES PATENT OFFICE.

GIOVANNI B. SICCARDI, OF NEW YORK, N. Y.

CAR BRAKE AND STARTER.

SPECIFICATION forming part of Letters Patent No. 400,129, dated March 26, 1889.

Application filed January 18, 1889. Serial No. 296,714. (No model.)

*To all whom it may concern:*

Be it known that I, GIOVANNI B. SICCARDI, of New York city, New York, have invented an Improvement in Car Brakes and Starters, of which the following is a specification.

My invention relates to certain improvements on the patent granted to me on June 7, 1887, and numbered 364,310; and my invention consists of the various improvements hereinafter more fully set forth and described.

Figure 2:
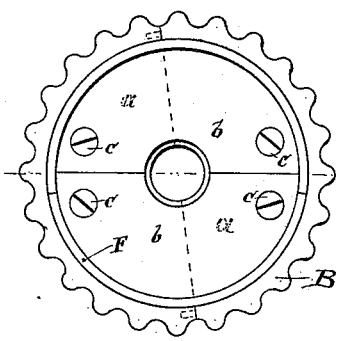
Figure 1:
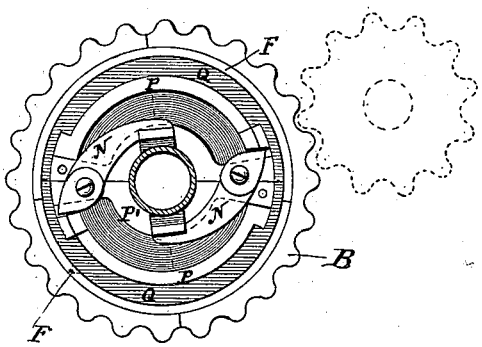
Figure 4:
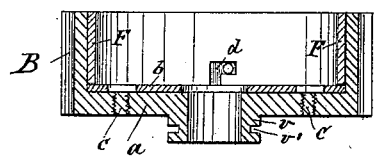
Figure 3:
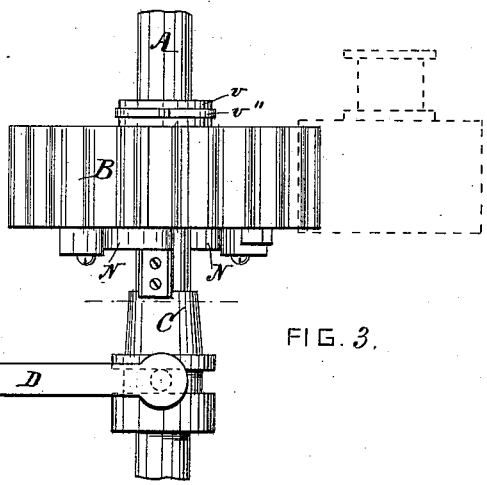
Figure 6:
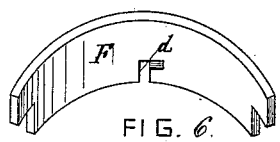
Figure 5:
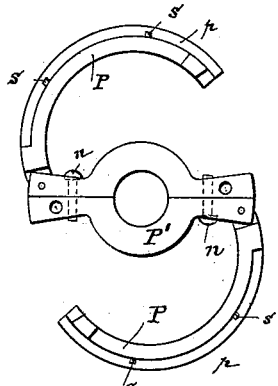
Figure 7:
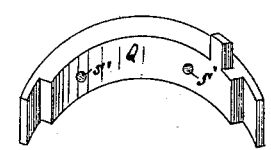

In the accompanying drawings, Figure 1 is a front view of the clutch-wheel and clutch, and showing the pinion working into the same in dotted lines. Fig. 2 is a rear view of the same. Fig. 3 is a top view of the same, showing part of the axle. Fig. 4 is a horizontal section of the same. Fig. 5 shows the construction of the clutch opened. Fig. 6 is a perspective view of the ring lining the clutch-wheel, and Fig. 7 is a perspective view of the ring around the clutch.

The gear-wheel B, placed upon the axle A, is made in two parts. Upon the disk $a$, at the rear of said wheel, a plate, $b$, made in two parts, is placed so that the division-line of said plate $b$ will come at right angles to the division-line of disk $a$ of the wheel, and they are secured together by bolts $c$. At the outer side of the disk $a$ a hub, $v$, is provided, arranged with a circular recess, $v'$, into which a strap or band, $v''$, is placed to hold the parts of the gear-wheel together, while the plate $b$ is secured to the disk $a$ by means of the above-mentioned bolts $c$. This construction is for the purpose of attaching or removing this wheel to or from the axle A when the same is in place under the car. The inner periphery of the gear-wheel B is lined by a ring, F, made in two parts, with step-shaped ends, one of said parts resting upon the ends or steps of the other part and secured to the rim of the gear-wheel by a bayonet-joint, $d$, as shown in Figs. 4 and 6.

P is the clutch-ring, made in two parts and hinged to the hub P', likewise made in two parts, secured together by bolts $n$ $n$, for the purpose of placing the same around the axle and into the gear-wheel or removing the same therefrom while the axle is under the car.

To the arms of the hub P' the levers N N are pivoted, the loose ends of which are operated by the clutch C, sliding upon the axle A and operated by the lever D, as and for the purpose described in my above-mentioned patent, No. 364,310. To the periphery of the ring P a lining or shoe, Q, is attached, resting upon a projecting flange, $p$, on the rings P, and secured by small projecting pins $s$, attached to said ring, and entering corresponding holes, $s'$, in the lining or shoes Q.

By the above-described construction of the gear-wheel and hub of the clutch-ring the same are easily removed from the axle A or arranged upon the same in the desired place while the axle is in position under the car, and by the arrangement of the lining F of the gear-wheel and the lining or shoes Q of the clutch-ring P the wear and tear of these surfaces can easily be corrected by the replacement of new linings whenever required.

What I claim is—

1. In combination with a gear-wheel, B, and internal clutch-rings, P, the lining F, attached to the gear-wheel, and the lining Q, attached to the clutch-rings, substantially as specified.

2. The combination of wheel B with sectional lining F, having step-shaped edges, and bayonet-slot $d$, for securing the lining to the wheel, substantially as specified.

3. The combination of the following elements: a sectional gear-wheel, B, divided plates $b$, and inner lining, F, and a clutch, P, having outer lining, Q, with wheel B, substantially as specified.

4. The combination of sectional wheel B, having disks $a$, and split and recessed hub $v$, with band $v''$, substantially as specified.

GIOVANNI B. SICCARDI.

Witnesses:
F. V. BRIESEN,
HENRY E. ROEDER.